US012679167B2

(12) United States Patent　　　　(10) Patent No.:　US 12,679,167 B2
Oguri et al.　　　　　　　　　　　　(45) Date of Patent:　Jul. 14, 2026

---

(54) VEHICLE

(71) Applicant: TOYOTA JIDOSHA KABUSHIKI KAISHA, Toyota (JP)

(72) Inventors: Haruki Oguri, Toyota (JP); Kenichi Yamada, Nisshin (JP); Mitsuhiro Miura, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 130 days.

(21) Appl. No.: 18/674,368

(22) Filed: May 24, 2024

(65) Prior Publication Data

US 2024/0424855 A1　　Dec. 26, 2024

(30) Foreign Application Priority Data

Jun. 26, 2023　　(JP) ................................. 2023-103956

(51) Int. Cl.
　B60H 1/00　　　　(2006.01)
(52) U.S. Cl.
　CPC ..... B60H 1/00271 (2013.01); B60H 1/00828 (2013.01); B60H 2001/003 (2013.01)
(58) Field of Classification Search
　CPC ............ B60H 1/00271; B60H 1/00828; B60H 2001/003; B60H 2001/00307; H05K 7/20863; H05K 7/20845
See application file for complete search history.

(56) References Cited

U.S. PATENT DOCUMENTS

| | | | | |
|---|---|---|---|---|
| 6,094,927 A | * | 8/2000 | Anazawa | .......... H01M 10/6563 |
| | | | | 62/239 |
| 2019/0300008 A1 | | 10/2019 | Ando | |
| 2019/0389275 A1 | * | 12/2019 | Eriksson | ............ B60H 1/00207 |
| 2020/0114730 A1 | * | 4/2020 | Kim | ................... B60H 1/00785 |
| 2020/0148136 A1 | * | 5/2020 | Takei | .................... B60W 40/08 |
| 2020/0189348 A1 | * | 6/2020 | Jackson | .................. B60R 11/04 |
| 2020/0231023 A1 | * | 7/2020 | Sathasivam | ........ B60H 1/00878 |
| 2020/0376926 A1 | * | 12/2020 | Nishiyama | ......... B60H 1/00778 |
| 2020/0386864 A1 | * | 12/2020 | Diehl | ................... G01D 3/0365 |
| 2021/0068312 A1 | * | 3/2021 | Tobiassen | .......... H05K 7/20872 |
| 2021/0221199 A1 | * | 7/2021 | Lee | ...................... B60H 1/3228 |
| 2021/0237722 A1 | | 8/2021 | Suzuki et al. | |
| 2023/0202256 A1 | * | 6/2023 | Lonberger | ......... B60H 1/00271 |
| | | | | 165/42 |

FOREIGN PATENT DOCUMENTS

| | | |
|---|---|---|
| CN | 112622562 A | 4/2021 |
| JP | 2016-098650 A | 5/2016 |
| JP | 2019-177807 A | 10/2019 |
| JP | 2021-123139 A | 8/2021 |

\* cited by examiner

*Primary Examiner* — Jianying C Atkisson
*Assistant Examiner* — For K Ling
(74) *Attorney, Agent, or Firm* — Sughrue Mion, PLLC

(57) ABSTRACT

The vehicle comprises a vehicle platform for controlling the vehicle and a ADK for transmitting commands for autonomous driving to the vehicle platform. A base vehicle of a vehicle platform includes a radiator device and a body ECU (first control device). The radiator device includes a radiator fan and is configured to cool ADK. The body ECU is configured to control the radiator fan according to a command from ADK.

7 Claims, 5 Drawing Sheets

FIG. 2

VEHICLE

CROSS-REFERENCE TO RELATED APPLICATION

This application claims priority to Japanese Patent Application No. 2023-103956 filed on Jun. 26, 2023, incorporated herein by reference in its entirety.

BACKGROUND

1. Technical Field

The present disclosure relates to a vehicle capable of autonomous driving.

2. Description of Related Art

Japanese Unexamined Patent Application Publication No. 2019-177807 (JP 2019-177807 A) discloses a vehicle including an autonomous driving kit attached to a rooftop. The autonomous driving kit includes a computer in which autonomous driving control software is installed, a camera, and a sensor.

When the autonomous driving is continued for a long period, the autonomous driving kit is likely to generate heat. Particularly when the vehicle during the autonomous driving continues to stop without traveling, the autonomous driving kit is not cooled by traveling air, and the temperature is therefore likely to increase. In order to stably operate the autonomous driving kit, it is conceivable to provide the autonomous driving kit with a cooling device for cooling the autonomous driving kit. Since the autonomous driving kit described in, for example, JP 2019-177807 A is smaller than the vehicle body, it is difficult to mount a large cooling device such as a radiator device on the autonomous driving kit. Therefore, a small cooling device with low cooling performance may be mounted on the autonomous driving kit. However, the vehicle including such an autonomous driving kit is required to operate the autonomous driving kit so that the temperature of the autonomous driving kit does not excessively increase when the ability to cool the autonomous driving kit is insufficient. There is a possibility that the ability of the autonomous driving kit cannot fully be exerted.

SUMMARY

The present disclosure has been made to solve the above problem, and an object thereof is to suppress an increase in temperature of an autonomous driving kit in a vehicle and therefore facilitate stable operation of the autonomous driving kit.

A vehicle according to an aspect of the present disclosure includes a vehicle platform configured to control the vehicle, and an autonomous driving kit configured to transmit a command for autonomous driving to the vehicle platform. The vehicle platform includes a radiator device and a first control device. The radiator device includes a radiator fan and is configured to cool the autonomous driving kit. The first control device is configured to control the radiator fan according to a command from the autonomous driving kit.

According to the present disclosure, the increase in the temperature of the autonomous driving kit in the vehicle is suppressed, and therefore stable operation of the autonomous driving kit is facilitated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 shows details of the control system of the vehicle shown in FIG. 1;

DETAILED DESCRIPTION OF EMBODIMENTS

Figure 1:
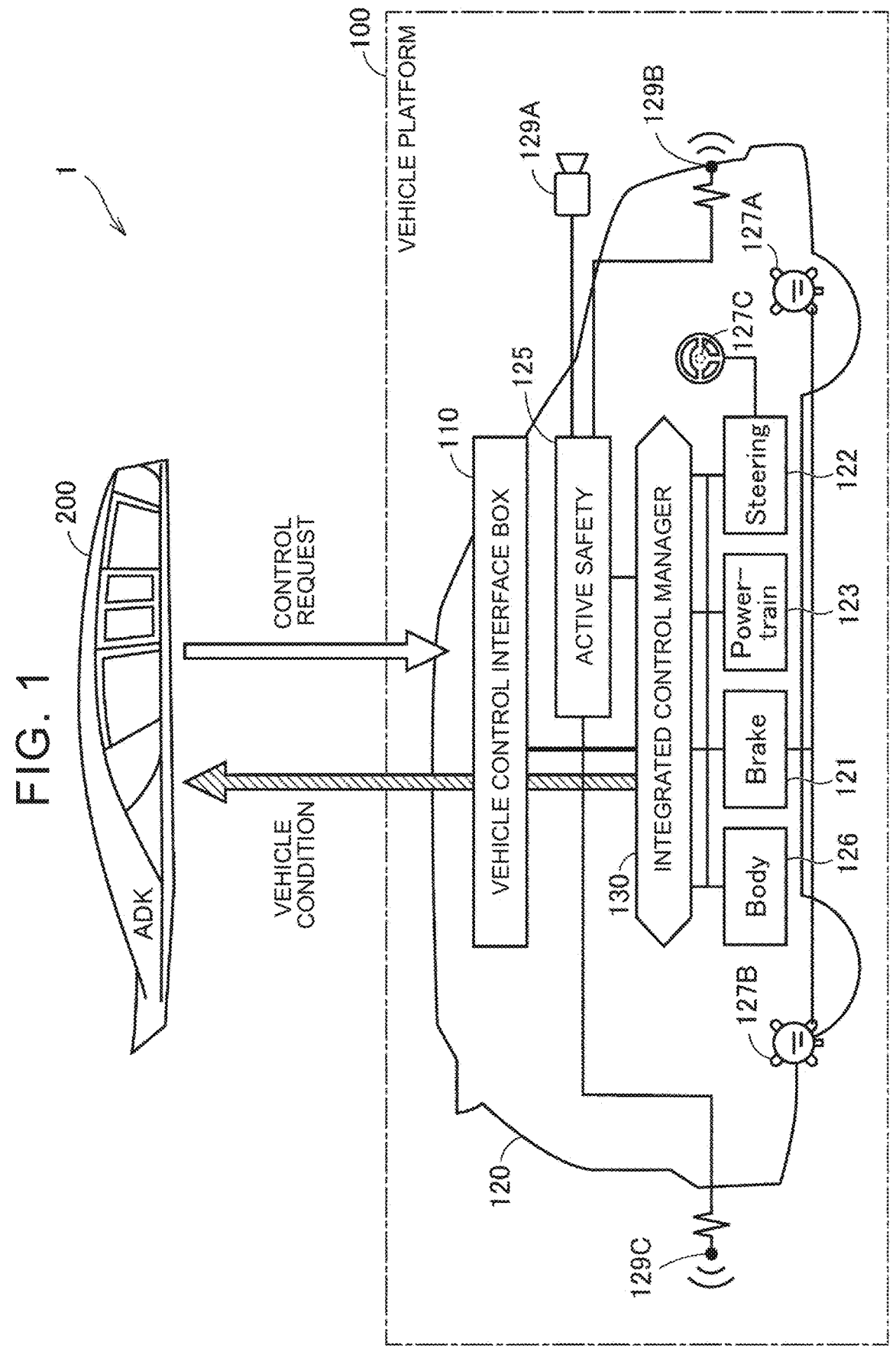
FIG. 1 is a diagram illustrating a schematic configuration of a vehicle according to an embodiment of the present disclosure.

Hereinafter, an embodiment of the present disclosure will be described in detail with reference to the drawings. In the drawings, the same or corresponding portions are denoted by the same reference signs and the description thereof will not be repeated.

FIG. 1 is a diagram illustrating a schematic configuration of a vehicle according to an embodiment of the present disclosure. Referring to FIG. 1, a vehicle 1 includes a VP (vehicle platform) 100 and a ADK (autonomous driving kit) 200. VP 100 includes a VCIB (Vehicle Control Interface Box) 110 and a base vehicle 120. By adding VCIB 110 to the base vehicle 120, a VP 100 to which ADK 200 can be attached and detached is formed. VCIB 110 is configured to communicate with both the base vehicle 120 and ADK 200 via communication busses. Then, the vehicle 1 is completed by attaching ADK 200 to VP 100. In this embodiment, a ADK 200 is attached to the rooftop of the base vehicle 120. However, the mounting position of ADK 200 can be changed as appropriate.

The base vehicle 120 is, for example, a commercially available x electrified vehicle (xEV). In this embodiment, battery electric vehicle (BEV) is employed as the base vehicle 120. However, the present disclosure is not limited thereto, and the base vehicle 120 may be a xEV other than BEV. The base vehicle 120 includes an integrated control manager 130, various systems and various sensors (wheel speed sensor 127A, 127B, steering angle sensor 127C, and the like) for controlling the base vehicle 120, and a camera 129A and radar sensor 129B, 129C for the active safety system 125 to detect a crash risk. The integrated control manager 130 functions as a control device. The integrated control manager 130 integrates and controls various systems related to the operation of the base vehicle 120 based on the detection result of the in-vehicle sensor.

Figure 2:
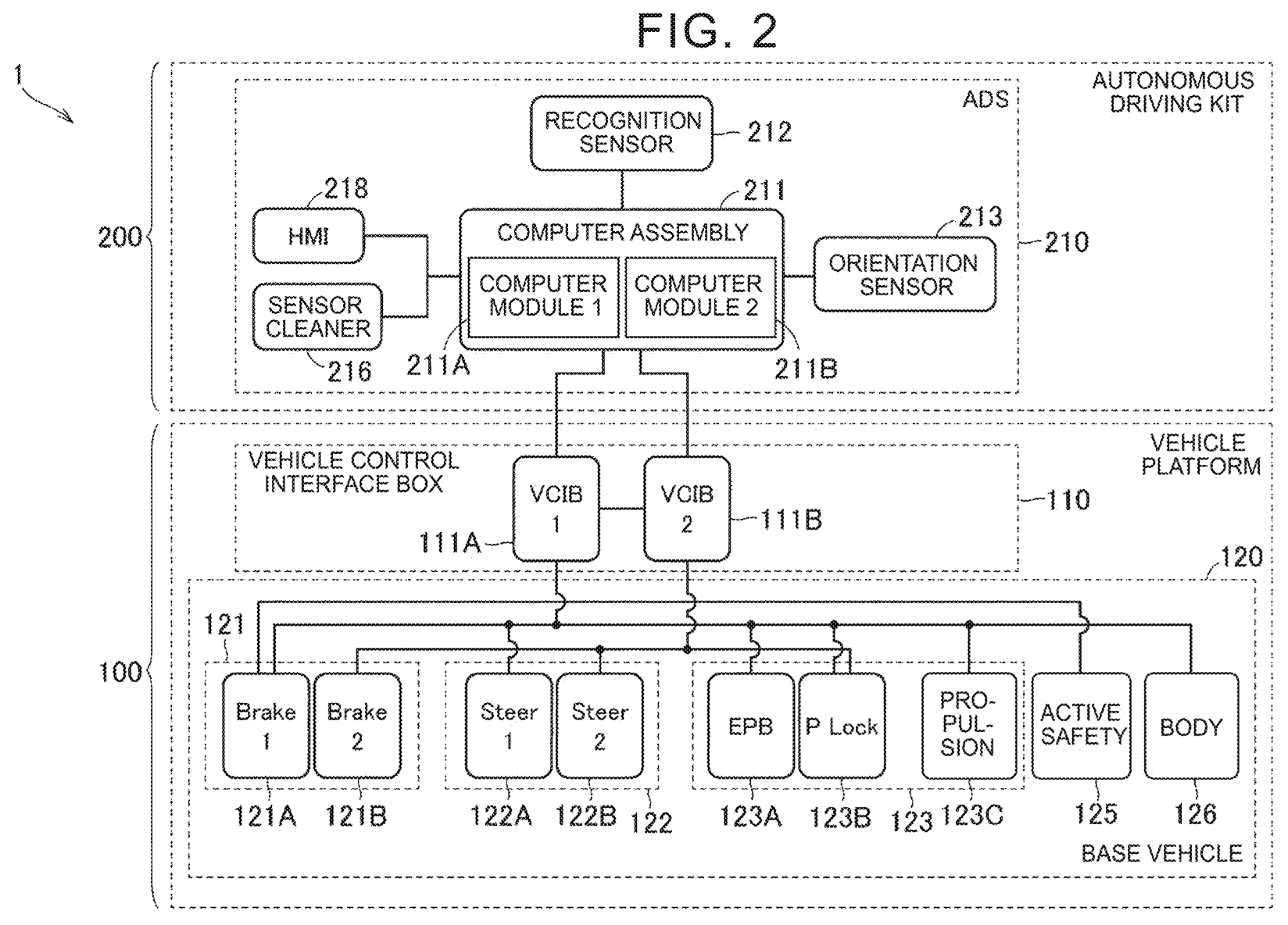

FIG. 2 is a diagram illustrating details of a control system of the vehicle 1. Referring to FIG. 2 together with FIG. 1, ADK 200 includes an autonomous driving system (hereinafter referred to as "ADS") 210 for performing autonomous driving of the vehicle 1. ADS 210 includes a computer assembly (hereinafter referred to as "ADSCOM") 211, a recognition sensor 212, an attitude sensor 213, a sensor cleaner 216, and a Human Machine Interface (HMI) 218.

ADSCOM 211 includes a computer module (hereinafter referred to as "ADC") 211A, 211B. Each of ADC 211A, 211B includes a processor and a storage device that stores autonomous driving software using an API, which will be described later, and is configured to be capable of executing autonomous driving software by the processor. The recognition sensor 212 acquires environment information indicating an external environment of the vehicle 1. The recognition sensor 212 may include at least one of a camera, a millimeter wave radar, and a lidar. The attitude sensor 213 acquires attitude information regarding the attitude of the vehicle 1. The attitude sensor 213 may include various sensors for detecting acceleration, angular velocity, and position of the vehicle 1. Each of ADC 211A, 211B further includes an image processing circuit that performs image processing on the environmental information, and a behavior calculation circuit that calculates the behavior of the vehicle 1 based on the attitude information. These circuits generate heat during automatic operation. HMI 218 includes an inputting device and a notification device.

The base vehicle 120 includes a brake system 121, a steering system 122, a powertrain system 123, an active safety system 125, and a body system 126. In this embodiment, the electronic control unit (hereinafter also referred to as "ECU") is provided.

In the vehicle 1, a control system related to the behavior (running, stopping, and bending) of the vehicle 1 has redundancy. ADC 211A, 211B gives instructions to the main-control system and the sub-control system, respectively. VCIB 110 includes a VCIB 111A (a control unit of a main control system) and a VCIB 111B (a control unit of a sub-control system). Each control unit may include a computer including a processor and a storage device. VCIB 111A and 111B may be in direct communication with the respective systems, or may be in communication via the integrated control manager 130 shown in FIG. 1.

The brake system 121 includes a brake mechanism, an operation unit that receives a brake operation from a driver, and a brake control unit 121A, 121B. The steering system 122 includes a steering mechanism, an operation unit that receives a steering operation from a driver, and a steering control unit 122A, 122B. The powertrain system 123 includes a shifting device, a vehicle drive, EPB device, a P-Lock device, a 123A of EPB controls, a 123B of P-Lock controls, and a 123C of propulsion controls. "EPB" means electric parking brake, and "P-Lock" means parking lock. The shift device determines the shift range and switches the propulsion direction and the shift mode of the base vehicle 120 according to the determined shift range. The shift device further includes, in addition to the transmission mechanism, an operation unit that receives a shift operation from the driver. The vehicle driving device applies a propulsive force in a propulsion direction indicated by the shift range. The vehicle driving device includes a battery and a traveling motor to which electric power is supplied from the battery. The vehicle driving device further includes an accelerator pedal operated by a driver to accelerate the vehicle 1. P-Lock device further includes an operation unit configured to receive a parking operation from the driver in addition to the parking lock mechanism and the actuator.

In this embodiment, various control devices (including a body ECU 126a to be described later) included in the base vehicle 120 function as the "first control device" according to the present disclosure alone or in cooperation with each other. Each of ADC 211A, 211B functions as a "second control device" according to the present disclosure. Further, each of VCIB 111A, 111B functions as a "third control device" according to the present disclosure.

Figure 3:
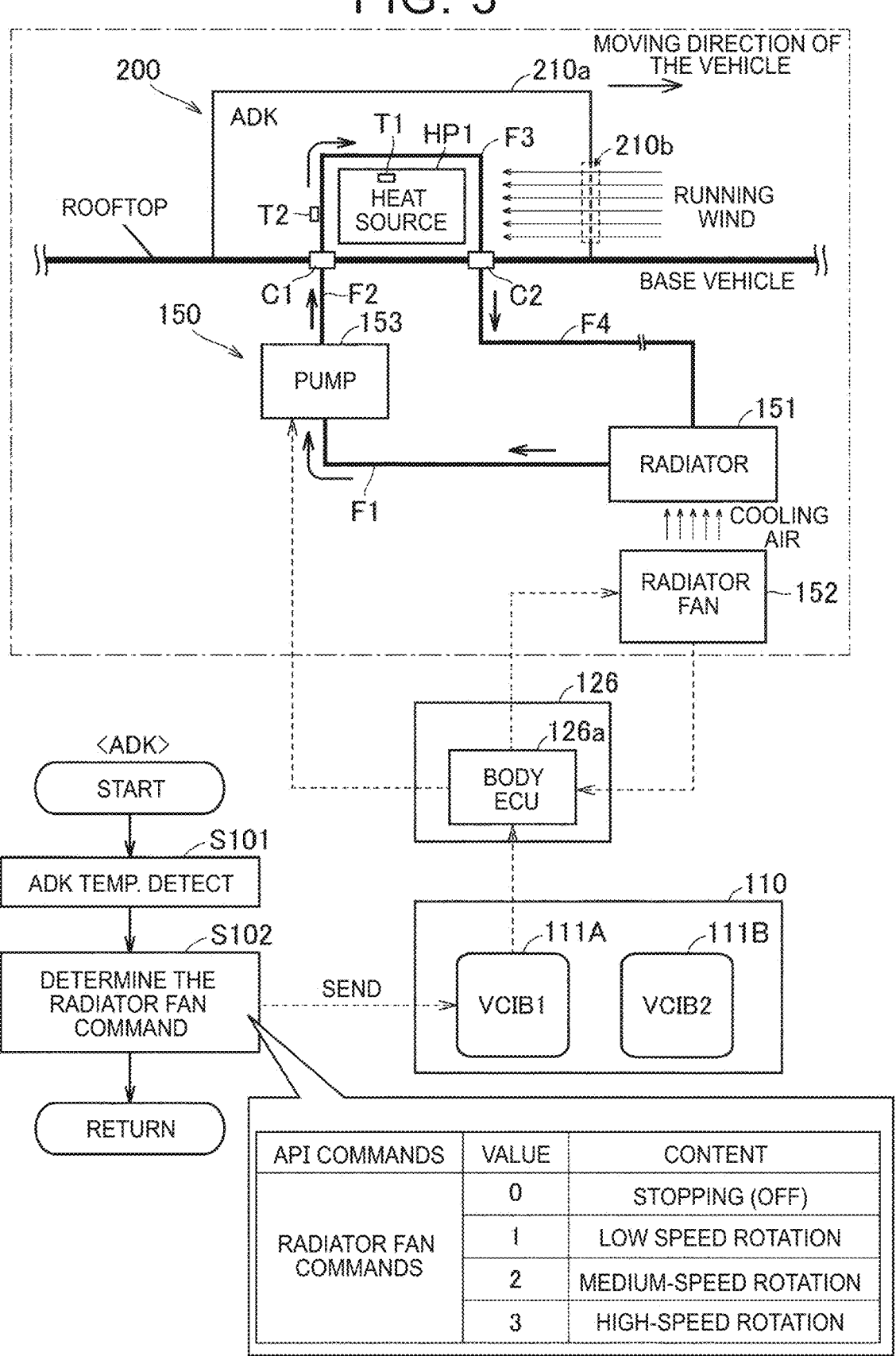
FIG. 3 is a flowchart illustrating vehicle control according to an embodiment of the present disclosure.

FIG. 3 is a diagram for explaining a radiator device and a control method thereof according to the embodiment.

Referring to FIG. 3, ADK 200 has a housing 210a. The base vehicle 120 includes a radiator device 150. The body system 126 includes a body ECU 126a. The radiator device 150 includes a radiator 151, a radiator fan 152, and a pump 153, and is configured to cool the heat source HP1 in the housing 210a of ADK 200. The heat source HP1 generates heat during automated operation. The heat source HP1 may include at least one of an ADC 211A, 211B, a recognition sensor 212, an attitude sensor 213, an image-processing circuit, and a behavior calculation circuit.

The housing 210a of ADK 200 has an opening 210b (for example, a front grille) that takes in traveling air and guides it to the heat source HP1. During the traveling of the vehicle 1, the heat source HP1 is cooled by the traveling air. However, in the autonomous driving vehicle 1, ADK 200 (heat source HP1) generates heat by sensing (operation of the autonomous driving system) even when the vehicle is stopped. When the frequency of stopping or traveling at a low speed increases in the vehicle 1 during automated driving, it becomes difficult to sufficiently cool ADK 200 only by the air-cooled cooling unit (opening 210b). Therefore, the vehicle 1 according to this embodiment cool the heat source HP1 also by the radiator device 150. Moreover, in the vehicle 1, a radiator device 150 for cooling ADK 200 is provided on the outer side of the base vehicle 120 (ADK 200). The base vehicle 120 is larger than ADK 200. Therefore, in the base vehicle 120, it is easy to secure an installation space for the radiator device 150. Such a radiator device 150 makes it easier to sufficiently cool ADK 200.

The rooftop of the base vehicle 120 includes a connector C1 and a C2. The radiator device 150 includes a flow path F1, F2, F4. ADK 200 includes a flow path F3. When ADK 200 is mounted on the roof top of the base vehicle 120, the flow paths F2 and F4 of the radiator device 150 are connected to ADK 200 flow path F3 via the connectors C1 and C2, respectively. Each of the connector C1, C2 switches between distribution and interruption in response to attachment and detachment of ADK 200. Each of the connector C1, C2 may be a fluidic coupling (e.g., a coupler) having a check valve.

When ADK 200 is mounted on the base vehicle 120, a fluid circuit including the flow path F1-F4 is formed, and the heat medium flows through the fluid circuit. A reservoir tank (not shown) may be connected to the fluid circuit. Examples of the heat medium include a fluorine-based refrigerant, carbon dioxide, propane, and ammonia. The radiator 151 functions as a heat exchanger. The radiator 151 exchanges heat between the heat medium flowing through the fluid circuit and the outside air. The radiator fan 152 functions as a blower that cools the radiator 151.

A pump 153 circulates a heat medium through the fluid circuit. The heat medium cooled by the radiator 151 flows in the order of the flow paths F1, F2, F3, F4. The heat medium flowing through the flow path F3 exchanges heat with the heat source HP1. The heat source HP1 is cooled by the heat exchanging. In this way, the heat source HP1 is cooled by the radiator device 150. The geometry and path of the flow path F3 are determined in view of the efficiency of the heat-exchange. The flow path F3 may be cooled by the traveling wind from the opening 210b. The radiator device 150 is controlled by a body ECU 126a. The pump 153 is, for example, an electric pump. The body ECU 126a drives the pump 153, for example, at all times or for a predetermined duration. Further, the body ECU 126a controls the radiator fan 152 in accordance with a command from ADK 200. The body ECU 126a may drive the pump 153 in accordance with a command from ADK 200.

In this embodiment, a signal (API signal) defined in Application Program Interface (API) is used for communication between ADK 200 and VCIB 110. ADK 200 is configured to process various types of signals defined in API. ADK 200 outputs various commands to VCIB 110 in accordance with API. Hereinafter, each of the various commands outputted from ADK 200 to VCIB 110 is also referred to as an "API command". ADK 200 also receives from VCIB 110 various signaling indicative of the status of the base vehicle 120 in accordance with API. Hereinafter, each of the above-described various types of signals received by ADK 200 from VCIB 110 is also referred to as "API status". Both API and API statuses correspond to API.

In this embodiment, ADK 200 uses API commands described below.

The vehicle mode command is an API command requesting a transition to an automated mode or a manual mode. The propulsion direction command is an API command requesting switching of a shift range (R/D). The acceleration command is an API command for instructing the acceleration of the vehicle. The acceleration command requests acceleration (+) and deceleration (−) with respect to a direction indicated by a propulsion direction status to be described later. The immobilization command is an API command requesting application or removal of immobilization. The application of immobilization means that EPB is in ON state (operating state) and the shift range is in the P (parking) state.

The radiator fan command illustrated in FIG. 3 is an API command related to the control (drive demand) of the radiator fan 152. The radiator fan command indicates any of a value "0" (a first value) requesting stopping (OFF) of the radiator fan 152, a value "1" (a second value) requesting that the rotational speed of the radiator fan 152 be set to a low speed (e.g., a speed V1 or higher and a speed V2 or lower), a value "2" (a third value) requesting that the rotational speed of the radiator fan 152 be set to a medium speed (e.g., a speed V2 higher and a speed V3 or lower) higher than the low speed, and a value "3" (a fourth value) requesting that the rotational speed of the radiator fan 152 be set to a high speed (e.g., a speed V3 higher and a speed V4 or lower) higher than the medium speed. The speed V1 to V4 is in the order of the speed V4, V3, V2, V1 from the higher rotational speed.

Some API commands used in the vehicle 1 have been described above. VCIB 110 receives various API commands from ADK 200. Upon receiving API command from ADK 200, VCIB 110 converts API command into a form of a signal executable by the controller of the base vehicle 120. Hereinafter, API command converted into the format of the signal executable by the control device of the base vehicle 120 is also referred to as an "in-house command". When VCIB 110 receives API command from ADK 200, it outputs an inside command corresponding to API command to the base vehicle 120.

Next, API status will be described. ADK 200 grasps the status of the base vehicle 120 using, for example, API status described below.

The vehicle mode status is an API status indicating a vehicle mode status. The vehicle mode includes a manual mode, an automatic mode, and a standby mode. The manual mode is a vehicle mode in which the vehicle is under the control of a driver (human). The automatic mode is a vehicle mode in which the vehicle platform (including the base vehicle) is under control of the autonomous driving kit. The standby mode is a vehicle mode in which movement of the vehicle is prohibited. In the initial state, the vehicle mode is the manual mode. The driver can select a desired vehicle-mode through the in-vehicle HMI. The base vehicle 120 determines the vehicle mode in consideration of the situation of the vehicle 1 and the selection of the driver. The vehicle mode status outputs corresponding values "0", "1", and "2"

when the current vehicle mode is the manual mode, the automatic mode, and the standby mode, respectively.

The propulsion direction status is an API status indicating the present shift range. The traveling direction status is an API status indicating a traveling direction of the vehicle. In the traveling direction status, the value "0" is outputted when the vehicle moves forward, the value "1" is outputted when the vehicle moves backward, and the value "2 (Standstill)" is outputted when all the wheels (four wheels) indicate the speed "0" for a certain period. The vehicle speed status is an API status indicating a vertical speed of the vehicle. The vehicle speed status outputs an absolute value of the vehicle speed. The immobilization status is an API status that indicates a state of immobilization (e.g., a state of EPB and shifting P).

The radiator fan status is an API status related to the driving status of the radiator fan 152. The radiator fan status outputs corresponding values "0", "1", "2", and "3" when the radiator fan 152 is in a stopped state, a low-speed rotation state, a medium-speed rotation state, and a high-speed rotation state, respectively. The radiator fan 152 is basically controlled in accordance with a radiator fan command from ADK 200. However, depending on the condition of the vehicle 1, the radiator fan 152 may not be controlled in accordance with the radiator fan command from ADK 200. That is, the radiator fan command and the radiator fan status may not correspond to each other.

Some API statuses used in the vehicle 1 have been described above. VCIB 110 receives various sensor detection values and state determination results from the base vehicle 120, and outputs various API statuses indicating the state of the base vehicle 120 to ADK 200. VCIB 110 acquires API status in which the status indicating the status of the base vehicle 120 is set, and outputs the obtained API status to ADK 200.

As illustrated in FIG. 3, ADK 200 further includes a heat source HP1, a temperature sensor T1 that directly detects a temperature of the heat source, and a temperature sensor T2 that detects a temperature of a medium (specifically, a heat medium flowing through the flow path F3) that exchanges heat with the heat source HP1. ADK 200 periodically executes S101 and S102 processes. This process is basically executed by ADC 211A shown in FIG. 2. However, when an error occurs in ADC 211A, ADC 211B may be executed instead of ADC 211A. ADK 200 may execute the process flow only in the automatic mode, or may execute the process flow in both the automatic mode and the manual mode. Each step in the flowchart is simply referred to as "S".

In S101, ADK 200 acquires the temperature sensor T1 and T2. In S102, ADK 200 uses the temperature sensor T1 and T2 to determine the radiator fan command. For example, when the temperature of the heat source HP1 is higher than the temperature of the heat medium flowing through the flow path F3, ADK 200 may increase the rotation speed of the radiator fan 152 as the temperature difference between the two decreases. Further, ADK 200 may determine "3" (high speed) as the value of the radiator fan command when the temperature of the heat medium flowing through the flow path F3 is higher than the temperature of the heat source HP1. The higher the rotational speed of the radiator fan 152, the more likely the radiator 151 (and the heat medium) is to be cooled. ADK 200 may determine the value of the radiator fan command by using only one of the detection result by the temperature sensor T1 and the detection result by the temperature sensor T2. ADK 200 may increase the rotation speed of the radiator fan 152 as the temperature of the heat source HP1 increases. Further, ADK 200 may increase the rotation speed of the radiator fan 152 as the temperature of the heat medium flowing through the flow path F3 increases. One of the temperature sensor T1 and T2 may be omitted.

The value determined in the above S102 indicates the rotational speed of the radiator fan 152 required by ADK 200 for VP 100 (base vehicle 120). ADK 200 sends a radiator fan command to VCIB 110 indicating the value determined by S102. Then, VCIB 111A outputs an inside command corresponding to the received radiator fan command to the body ECU 126a. The rotational speed indicated by the radiator fan command (either stop, low speed, medium speed, or high speed) is sent from ADC 211A to the body ECU 126a via VCIB 111A. If an error occurs in VCIB 111A, VCIB 111B may generate an inner command instead of VCIB 111A. The body ECU 126a controls the rotation speed of the radiator fan 152 to the rotation speed indicated by the radiator fan command while detecting the rotation speed of the radiator fan 152. As described above, ADK 200 transmits a command indicating the rotation speed determined by S102 to the body ECU 126a. This facilitates proper cooling of the heat source HP1 in ADK 200 by the radiator device 150.

In the autonomous driving vehicle 1, ADK 200 may determine the radiator fan command by using the behavior of the vehicle 1 as well as the determination by at least one of the temperature sensor T1 and T2.

Figure 4:
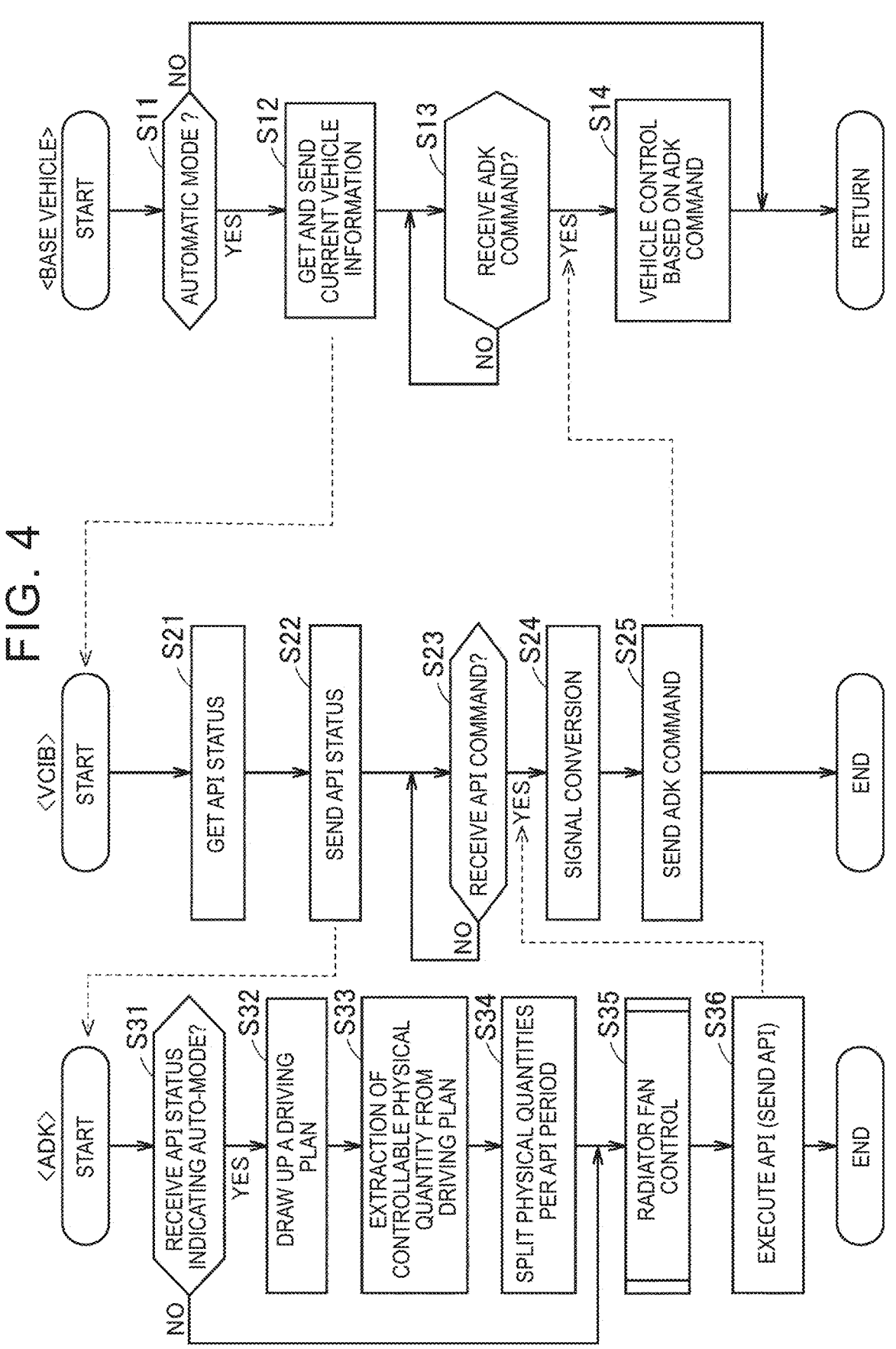
FIG. 4 is a diagram for describing a radiator device according to an embodiment of the present disclosure.

FIG. 4 is a flowchart for explaining the automatic driving control of the vehicle 1 according to this embodiment. Referring to FIG. 4, S11-S14 process flow is repeatedly executed by any one of a plurality of control devices (for example, the integrated control manager 130 illustrated in FIGS. 1 and 2 and a control device of the respective systems) included in the base vehicle 120. In S11, the base vehicle 120 determines whether the vehicle mode of the vehicle 1 is the automated mode. When the vehicle mode is not the auto mode (NO in S11), the process does not proceed and S11 process is repeated. When the vehicle mode is the auto mode (YES in S11), the process proceeds to S12.

In S12, the base vehicle 120 obtains the present vehicle information and transmits the obtained vehicle information to VCIB 110. The current vehicle information includes information indicating that the vehicle mode is the automatic mode, various sensor detection values indicating the state of the current base vehicle 120 (including the rotational speed of the radiator fan 152), and a state determination result based on the user operation or the sensor detection value. The base vehicle 120 may store the current vehicle information in the storage device in association with the acquisition time.

After transmitting the vehicle data, the base vehicle 120 waits for ADK command while determining whether or not a command (ADK command) from ADK 200 has been received in S13. While the base vehicle 120 does not receive ADK command (NO in S13), the process does not proceed to S14.

The process flow of S21-S25 is executed by VCIB 110 (VCIB 111A or 111B). When VCIB 110 receives the present vehicle data from the base vehicle 120, it starts a process flow. In S21, VCIB 110 obtains various API statuses (including radiator fan statuses) indicating the status of the current base vehicle 120 based on the current vehicle data. VCIB 110 may determine values of various API statuses based on various sensor detected values. VCIB 110 may store the acquired various API statuses in the storage device in association with the acquisition time. In the following S22, VCIB 110 transmits various API statuses acquired by S21 to ADK 200. Thereafter, VCIB 110 waits for an API command while determining whether an API command has been received from ADK 200 in S23. While VCIB 110 does not receive API command (NO in S23), the process does not proceed to S24.

The process flow of S31-S36 is executed by ADK 200 (ADC 211A or 211B). Upon receiving API status from VCIB 110, ADK 200 starts a process flow. In S31, ADK 200 determines whether the received vehicle mode status indicates the auto mode. When the vehicle mode status does not indicate the auto mode (NO in S31), ADK 200 executes a process related to the radiator fan control (for example, S101 and S102 illustrated in FIG. 3) in S35. In S102 of FIG. 3, ADK 200 may determine the value of the radiator fan command using the value of the radiator fan status (rotation speed of the radiator fan 152) and the detected value by at least one of the temperature sensor T1 and T2. ADK 200 then sends a radiator fan command to VCIB 110 in a subsequent S36 (see FIG. 3).

On the other hand, when the vehicle-mode status indicates the auto-mode (YES in S31), ADK 200 creates a travel plan on the basis of the detection results (for example, environmental information and attitude information) of the various sensors and API status acquired from VCIB 110 in S32. The travel plan is data indicating the behavior of the target vehicle 1 in a predetermined period. ADK 200 may calculate the behavior (vehicle speed, attitude, and the like) of the vehicle 1 and create a travel plan suitable for the condition of the vehicle 1 and the external environment. In the following S33, ADK 200 extracts a control physical quantity (acceleration, tire-breaking angle, and the like) from the travel plan created by S32. In the following S34, ADK 200 divides the physical quantity extracted by S33 for each API cycle. Then, ADK 200 obtains an autonomous driving command (the value of various API commands) for realizing the physical quantity according to the traveling plan, based on the divided physical quantity. Subsequently, ADK 200 executes a process related to the radiator fan control (for example, S101 and S102 illustrated in FIG. 3) in S35. In S102 of FIG. 3, ADK 200 may predict the temperature change of the heat source HP1 by using the detected result of at least one of the temperature sensor T1 and T2 and the behavior of the vehicle 1 during autonomous driving calculated by S32. Then, ADK 200 may determine the value of the radiator fan command using the predicted result and the value of the radiator fan status. Subsequently, ADK 200 transmits various API commands including a radiator fan command to VCIB 110 in S36 (see FIG. 3). According to this configuration, it is possible to appropriately control the rotational speed of the radiator fan 152 in accordance with the temperature change of the heat source HP1. Since ADK 200 calculates the behavior of the vehicle 1 in the autonomous driving control, it is easy to predict the effect of the traveling wind (FIG. 3) on the temperature of the heat source HP1 based on the behavior of the vehicle 1.

API commands sent in S36 indicate commands to the base vehicle 120. In the automatic mode, API command indicating the automatic driving command is determined by S32-S34 and transmitted by S36. ADK 200 may store the obtained API commands together with API status values received from VCIB 110 in the storage device in association with the acquired time. When S36 process is executed, S31-S36 process flow ends. However, each time ADK 200 receives an API status (S22), the process flow is started.

When VCIB 110 receives API command (YES in S23), it converts the received API commands into an inner command in S24. These transformations result in a command corresponding to API command. In a subsequent S25, VCIB 110 transmits the obtained ADK command to the base vehicle 120. When S25 process is executed, S21-S25 process is terminated. However, each time VCIB 110 receives the most recent vehicle data from the base vehicle 120, the process flow is started.

Upon receiving an internal command (ADK command) corresponding to API command (YES in S13), the base vehicle 120 executes vehicle control (including radiator fan control) in accordance with ADK command in a subsequent S14. In the automatic mode, the base vehicle 120 executes the automatic driving control according to the automatic driving command (ADK command) from ADK 200. The process then returns to the first step (S11).

As described above, the vehicle 1 according to this embodiment includes a VP 100 (vehicle platform) that controls the vehicle 1, and a ADK 200 (autonomous driving kit) that transmits a command for autonomous driving to VP 100. VP 100 includes a radiator device 150 and a body ECU 126a (first control device). The radiator device 150 includes a radiator fan 152 and is configured to cool ADK 200. The body ECU 126a is configured to control the radiator fan 152 in accordance with a command from ADK 200. In such a vehicle 1, since the autonomous driving kit can control its own state (temperature), it is easy to stably operate. According to the above configuration, ADK 200 can be easily operated stably by suppressing an increase in the temperature of ADK 200 in the vehicle 1.

Figure 5:
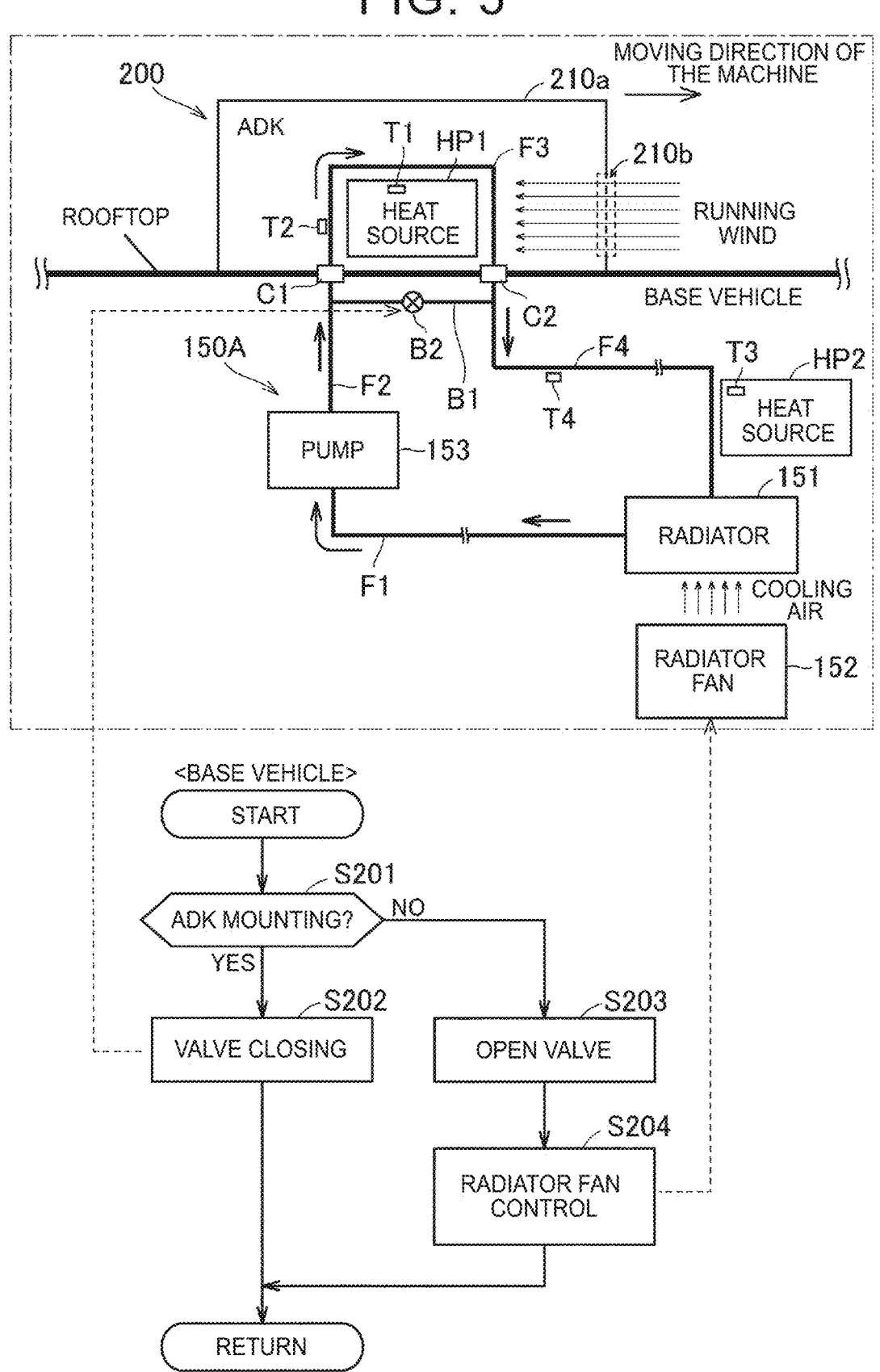
FIG. 5 is a diagram illustrating a modification of the configuration illustrated in FIG. 3.

FIG. 5 is a diagram illustrating a modification of the configuration illustrated in FIG. 3. In this modification, the fluidic circuit further includes, in addition to the flow path F1-F4, a bypass flow path B1 connecting the flow path F2 and the flow path F4, and a valve B2 provided in the bypass flow path B1. The bypass flow path B1 is formed on the side of the base vehicle 120 (for example, in the vicinity of the rooftop). The radiator device 150A according to this modification basically has the same configuration as the radiator device 150 shown in FIG. 3. However, the radiator device 150A is configured to cool not only the heat source HP1 of ADK 200 but also the heat source HP2 of the base vehicle 120. The flow path F4 is formed so that the heat medium flowing through the flow path F4 exchanges heat with the heat source HP2. The heat source HP2 is a component that generates heat in the base vehicle 120, and may include a power converter (for example, an inverter for electric driving). The base vehicle 120 further includes a temperature sensor T3 that directly detects the temperature of the heat source HP2, and a temperature sensor T4 that detects the temperature of a medium (specifically, a heat medium flowing through the flow path F4) that exchanges heat with the heat source HP2.

The base vehicle 120 (e.g., body ECU 126a) periodically executes S201-S204 process flow. In S201, the base vehicle 120 determines whether a ADK 200 is attached to the base vehicle 120 (the connector C1 and C2). When it is determined that ADK 200 is attached to the base vehicle 120 (YES in S201), the base vehicle 120 puts the valve B2 in a closed state (shut-off state) by the base vehicle 120 in S202. When ADK 200 is mounted on the base vehicle 120, the radiator fan control (S101 and S102 shown in FIG. 3) by the above-described ADK 200 is executed. Thereby, the heat source HP1 and HP2 are cooled. On the other hand, when it is determined that ADK 200 is not attached to the base vehicle 120 (NO in S201), the base vehicle 120 puts the valve B2 in the open state (flow state) of the base vehicle 120 in S203. In a state in which ADK 200 is not attached to the base vehicle 120, the flow path is shut off by the connectors C1 and C2, and the valve B2 is opened so that the bypass-flow path B1 is brought into a flow state. In S204, the base vehicle 120 controls the radiator fan 152 so that the heat source HP2 is cooled to the target temperature by using the temperature sensor T3 and T4. The base vehicle 120 may determine the rotation speed of the radiator fan 152 in a manner similar to the radiator fan control by ADK 200 described above (see FIG. 3).

According to the configuration according to the modification, in a state in which ADK 200 is attached to the base vehicle 120, an increase in temperature of the heat source HP1, HP2 can be suppressed by the radiator device 150A, and in a state in which ADK 200 is not attached to the base vehicle 120, an increase in temperature of the heat source HP2 can be suppressed by the radiator device 150A.

It is to be understood that the embodiments disclosed herein are illustrative and non-restrictive in all respects. The technical scope indicated by the present disclosure is indicated by the claims rather than the description of the above-described embodiments, and is intended to include all modifications within the meaning and scope equivalent to the claims.

What is claimed is:

1. A vehicle comprising:
a vehicle platform configured to control the vehicle; and
an autonomous driving kit configured to transmit a command for autonomous driving to the vehicle platform,
wherein:
the vehicle platform includes a radiator device and a first processor,
the autonomous driving kit includes a heat source to be cooled by the radiator device, a second processor, which is different from the first processor, and a storage device that stores software for the autonomous driving;
the radiator device includes a radiator fan and is configured to cool the heat source of the autonomous driving kit;
the second processor determines a command related to control of the radiator fan based on at least one of: (i) a temperature of the beat source and (ii) a temperature of a medium that exchanges heat with the heat source, and sends the command related to control of the radiator fan to the first processor; and
the first processor is configured to control the radiator fan according to the command related to the control of the radiator fan from the second processor of the autonomous driving kit.

2. The vehicle according to claim 1, wherein:
the autonomous driving kit includes
a temperature sensor configured to detect at least one of a temperature of the heat source and a temperature of a medium for exchanging heat with the heat source; and
the autonomous driving kit is configured to determine a rotation speed of the radiator fan by using a detection result from the temperature sensor, and transmit a command indicating the determined rotation speed to the first processor.

3. The vehicle according to claim 2, wherein:
the autonomous driving kit has an opening through which traveling air is taken in and guided to the heat source; and
the autonomous driving kit is configured to:
predict a temperature change of the heat source by using the detection result from the temperature sensor and a behavior of the vehicle during the autonomous driving,
determine the rotation speed of the radiator fan based on a prediction result, and transmit a command indicating the determined rotation speed to the first processor.

4. The vehicle according to claim 1, wherein:

the vehicle platform includes a base vehicle including the first processor;

the vehicle platform further includes a vehicle control interface box including a third processor configured to communicate with both the first processor and the second processor;

the first processor is configured to transmit vehicle information related to the base vehicle to the third processor;

an application program interface signal defined in an application program interface is used for communication between the second processor and the third processor;

the application program interface signal includes an application program interface command indicating a command for the base vehicle, and an application program interface status indicating a status of the base vehicle;

the third processor is configured to convert the application program interface command from the second processor into a signal executable by the first processor, and transmit the converted signal to the first processor; and the third processor is configured to acquire the application program interface status by using the vehicle information from the first processor, and transmit the acquired application program interface status to the second processor.

5. The vehicle according to claim 4, wherein:

the radiator fan control command determined by the second processor indicates either one of:

a first value for requesting a stop of the radiator fan, a second value for requesting a low rotation speed of the radiator fan, a third value for requesting a medium rotation speed of the radiator fan that is higher than the low rotation speed, and a fourth value for requesting a high rotation speed of the radiator fan that is higher than the medium rotation speed.

6. The vehicle according to claim 1, wherein the second processor predicts a change in temperature of the heat source by using the temperature of the heat source and behavior of the vehicle during autonomous driving calculated from a travel plan, and determines the command related to the control of the radiator fan using the predicted change in temperature and status of the radiator fan.

7. The vehicle according to claim 1, further comprising a communication bus, and wherein the vehicle platform and the autonomous driving kit communicate via the communication bus.

* * * * *